US009360350B2

(12) United States Patent
Ollila et al.

(10) Patent No.: US 9,360,350 B2
(45) Date of Patent: Jun. 7, 2016

(54) LIGHT GUIDE FOR AN INSTRUMENT CLUSTER

(75) Inventors: Curt Ollila, Fenton, MI (US); Taochuan Wang, Novi, MI (US); Kevin Dyer, Macomb Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 203 days.

(21) Appl. No.: 13/542,708

(22) Filed: Jul. 6, 2012

(65) Prior Publication Data

US 2014/0009957 A1    Jan. 9, 2014

(51) Int. Cl.
*B60Q 3/04*    (2006.01)
*G01D 11/28*    (2006.01)
*B60Q 3/02*    (2006.01)

(52) U.S. Cl.
CPC .............. *G01D 11/28* (2013.01); *B60Q 3/022* (2013.01); *B60Q 3/04* (2013.01); *B60Q 3/042* (2013.01); *B60Q 3/044* (2013.01); *B60K 2350/203* (2013.01); *B60K 2350/2043* (2013.01)

(58) Field of Classification Search
CPC .......... B60Q 3/00; B60Q 3/002; B60Q 3/004; B60Q 3/005; B60Q 1/0011; B60Q 3/04; B60Q 3/042; B60Q 3/044; B60K 2350/203; B60K 2350/2043; G02B 6/00; G02B 6/0096

USPC .............. 362/23.09, 23.16, 23.18, 23.1, 511, 362/489, 559
See application file for complete search history.

(56) References Cited

U.S. PATENT DOCUMENTS

| | | | |
|---|---|---|---|
| 6,682,201 B2 | 1/2004 | Kneer et al. | |
| 7,494,256 B1 * | 2/2009 | Kelman et al. | 362/489 |
| 8,692,660 B2 * | 4/2014 | Fitzgerald et al. | 340/441 |
| 2006/0018109 A1 * | 1/2006 | Kageyama et al. | 362/23 |
| 2006/0209525 A1 | 9/2006 | Birman et al. | |
| 2010/0083894 A1 * | 4/2010 | Birman et al. | 116/288 |
| 2012/0287664 A1 * | 11/2012 | Coser et al. | 362/559 |
| 2013/0087092 A1 * | 4/2013 | Hashimoto et al. | 116/286 |

FOREIGN PATENT DOCUMENTS

DE   102010055077 A1   6/2012
JP   WO2012057035 A1 *  5/2012

OTHER PUBLICATIONS

European Search Report, EP 13 16 888, dated Oct. 9, 2013.

* cited by examiner

*Primary Examiner* — Robert May

(57) ABSTRACT

An example instrument cluster includes a light guide having a first end portion and a display located adjacent the first end portion of the light guide for emitting light into the light guide.

16 Claims, 1 Drawing Sheet

LIGHT GUIDE FOR AN INSTRUMENT CLUSTER

BACKGROUND

This disclosure generally relates to an instrument cluster. More particularly, this disclosure relates to an instrument cluster for a vehicle and a method of illuminating the instrument cluster.

Vehicles include instrument clusters having illuminated gages and screens to aid a user in monitoring vehicle information such as speed, oil pressure, RPM, fuel, voltage, etc. Illuminated gauges generally comprise a dial associated with vehicle information on the face of the gauge, a light source, and a pointer that is driven by a motor for movement relative to the gauge face. The gauge face includes spaced markings that indicate specified vehicle information over a given range. The light source generally includes bulbs or LEDs located behind the illuminated gauges to increase the visibility and aesthetics of the gauges.

SUMMARY

An example instrument cluster includes a light guide having a first end portion and a display located adjacent the first end portion of the light guide.

The example instrument cluster assembly includes a housing, at least one light guide having a first end portion located within the housing and at least one display located adjacent each first end portion of the at least one light guide.

An example method of illuminating an instrument cluster includes illuminating a light guide with a display and varying a luminance and a color of the display to vary a luminance and a color of the light guide.

These and other features of the disclosed examples can be understood from the following description and the accompanying drawings, which can be briefly described as follows.

DETAILED DESCRIPTION

Figure 1:
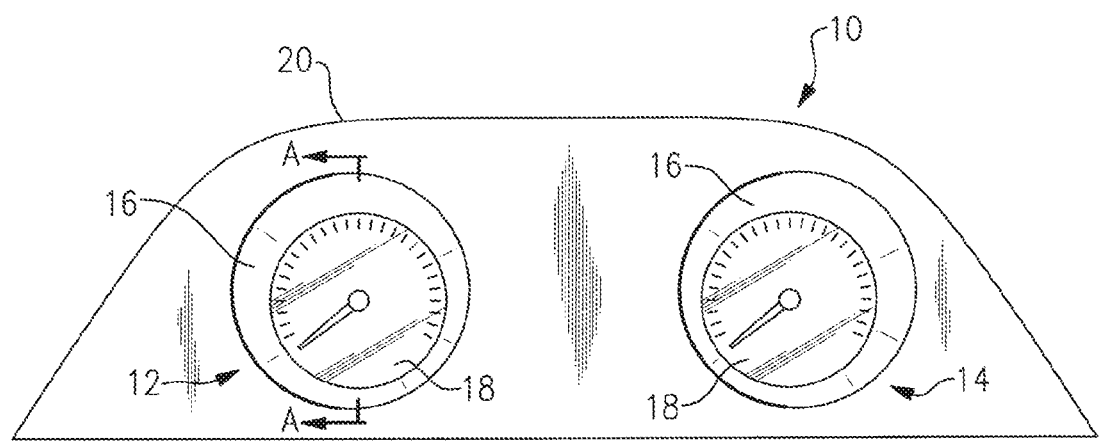
FIG. 1 illustrates an example instrument cluster assembly.

FIG. 1 illustrates an example instrument cluster assembly 10. The instrument cluster assembly 10 includes a first instrument cluster gage 12 and a second instrument cluster gage 14. The first instrument cluster gage 12 and the second instrument cluster gage 14 include an instrument panel mask or hood provided by a light guide 16, and an instrument face 18. The first and second instrument cluster gages 12 and 14 are located within a housing 20. In the illustrated example, the first and second instrument cluster gages 12 and 14 may provide any one of the following: vehicle speed, engine RPM, fuel level, voltage level, or other vehicle information relevant to the operation of a vehicle.

Although, the illustrated example only includes the first and second instrument cluster gages 12 and 14, one of ordinary skill in the art would recognize that the number, size, and shape of the instrument cluster gages could vary depending on the number and type of operational states desired to be displayed on the instrument cluster assembly 10.

Figure 2:
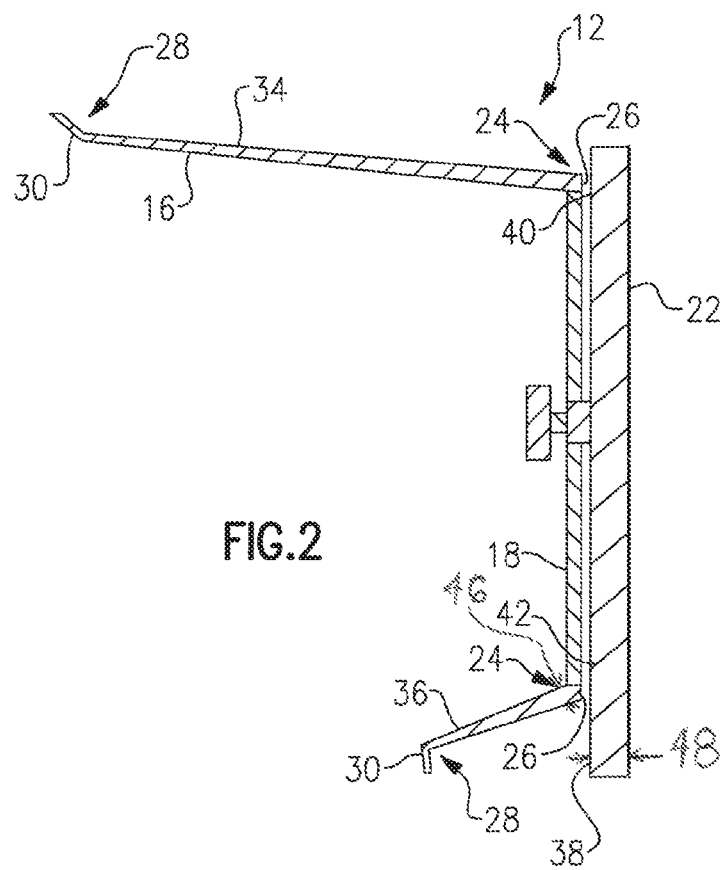
FIG. 2 illustrates a cross-sectional view of an instrument cluster gage taken along line A-A of FIG. 1.

FIG. 2 illustrates a cross-sectional view of the first instrument cluster gage 12 of FIG. 1 taken along line A-A. A display 22, such as a thin film transistor (TFT) display or another type of display capable of producing a multitude of colors at varying luminance, is located adjacent a first end portion 24 of the light guide 16. The first end portion 24 of the light guide 16 is spaced inwardly from a perimeter of the display 22.

The light guide 16 in this example is made of a clear acrylic material or another transparent thermoplastic. Although the light guide 16 is shown with a generally tubular shape, one of ordinary skill in the art would recognize that the light guide 16 could be rectangular, elliptical, or have a discontinuous perimeter.

The instrument face 18 is located radially inward from the light guide 16 and adjacent the first end portion 24 of the light guide 16. The first end portion 24 of the light guide 16 includes a light receiving portion 26 for accepting light from the display 22. The second end portion 28 of the light guide 16 includes a transitional portion 30 for engaging the housing 20 and providing a sealed transition between the light guide 16 and the housing 20.

A first side 34 of the light guide 16 extends a first distance from the first end portion 24 to the second end portion 28 and a second side 36 of the light guide 16 extends a second distance from the first end portion 24 to the second end portion 28. In the illustrated example, the first distance is greater than the second distance. A maximum thickness 46 of the light guide 16 is substantially less than a maximum thickness 48 of the display screen.

The display 22 includes a light emitting surface 38 located adjacent the light guide 16. The display 22 illuminates the light guide 16 and is capable of producing multiple colors of the same or varying luminance. The light emitted from the display 22 is received by the light receiving portion 26 causing the light guide 16 to glow according to the light being emitted by the display 22. A first portion 40 of the display 22 is capable of producing a first color having a first luminance and a second portion 42 of the display 22 is capable of producing a second color having a second luminance. The first and second colors and the first and second intensities may be the same or different. Although the above illustrated example discloses two different portions on the display 22, the display 22 may include any number of portions as dictated by the number of pixels on the display 22.

Although a preferred embodiment of this disclosure has been disclosed, a worker of ordinary skill in this art would recognize that certain modifications would come within the scope of this disclosure. For that reason, the following claims should be studied to determine the true scope and content of this invention.

What is claimed is:
1. An instrument cluster comprising:
a light guide having a first end portion, the light guide being at least partially tubular and having a first side disposed opposite a second side; and
a pixelated display screen having an outer periphery located adjacent the first end portion of the light guide, wherein the display screen is configured to emit light into the light guide to illuminate the light guide,
an instrument face and located radially inward from the light guide and adjacent the first end portion of the light guide and radially inward from the outer periphery of the display screen;
the light guide comprising an instrument hood, the light guide having a maximum thickness substantially less than a maximum thickness of the display screen, the first side of the light guide extending a first distance from the first end portion to a second end portion, and the second side of the light guide extending a second distance from the first end portion to the second end portion, the first distance being greater than the second distance wherein the light guide encircles the instrument face and extends outwardly with respect to a plane of said display and adjacent an outside perimeter of the instrument face.

2. The instrument cluster of claim 1, comprising an instrument face located radially inward from the light guide and adjacent the first end portion of the light guide.

3. The instrument cluster of claim 1, wherein the light guide is made of a transparent thermoplastic.

4. The instrument cluster of claim 1, wherein the first end portion of the light guide includes a light receiving portion.

5. The instrument cluster of claim 4, wherein the display screen is configured to emit light into the light receiving portion.

6. The instrument cluster of claim 1, wherein a second end portion of the light guide including a transitional portion.

7. The instrument cluster of claim 1, wherein the display screen is a thin film transistor.

8. The instrument cluster of claim 1, wherein the first end portion of the light guide is spaced inwardly from a perimeter of the display screen.

9. An instrument cluster assembly comprising:
a housing;
at least one light guide instrument hood having a first end portion located within the housing, the light guide being at least partially tubular and having a first side disposed opposite a second side;
an instrument face for a gauge of a vehicle, and
at least one pixelated display screen having an outer periphery extending beyond the display face located adjacent the first end portion of the at least one light guide, the first side of the at least one light guide extending a first distance from the first end portion to a second end portion, and the second side of the at least one light guide extending a second distance from the first end portion to the second end portion, the first distance being greater than the second distance, wherein the at least one display screen is configured to communicate light to the at least one light guide for illuminating the at least one light guide wherein the light guide encircles the instrument face and extends outwardly with respect to a plane of said display and adjacent an outside perimeter of the instrument face, and wherein the light guide has a maximum thickness substantially less than a maximum thickness of the display screen.

10. The instrument cluster assembly of claim 9, further including wherein the instrument face is located radially inward from the at least one light guide and adjacent the first end portion of the at least one light guide.

11. The instrument cluster assembly of claim 9, wherein the first end portion of the at least one light guide includes a light receiving portion.

12. The instrument cluster assembly of claim 11, wherein the display screen is configured to emit light into the light receiving portion.

13. A method of illuminating an instrument cluster comprising:
providing an instrument face and a pixelated display screen extending beyond an outer periphery of the instrument face illuminating first and second sides of a light guide instrument hood, that is at least partially encircling the instrument face, said light guide being at least partially tubular, the first and second sides having unequal lengths, with the display screen, and wherein the light guide has a maximum thickness substantially less than a maximum thickness of the display; and
varying a luminance and a color of the display screen to vary a luminance and a color of the first and second sides of the light guide, wherein the light guide extends outwardly with respect to a plane of said display and adjacent an outside perimeter of the instrument face.

14. The method of claim 13, wherein a first portion of the display screen has a first luminance and a second portion of the display screen has a second luminance that is different from the first luminance.

15. The method of claim 14, wherein a first portion of the display screen has a first color and a second portion of the display screen has a second color that is different from the first color.

16. The method of claim 13, wherein the light guide includes an instrument face located radially inward from the light guide.

* * * * *